(12) United States Patent
Choi

(10) Patent No.: US 8,962,178 B2
(45) Date of Patent: Feb. 24, 2015

(54) BATTERY PACK

(75) Inventor: Bum-Kuk Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 281 days.

(21) Appl. No.: 13/477,931

(22) Filed: May 22, 2012

(65) Prior Publication Data

US 2012/0301748 A1 Nov. 29, 2012

Related U.S. Application Data

(60) Provisional application No. 61/489,812, filed on May 25, 2011.

(51) Int. Cl.
| | |
|---|---|
| *H01M 2/04* | (2006.01) |
| *H01M 2/22* | (2006.01) |
| *H01M 2/34* | (2006.01) |
| *H01M 2/02* | (2006.01) |
| *H01M 2/30* | (2006.01) |
| *H01M 10/42* | (2006.01) |
| *H01M 2/36* | (2006.01) |

(52) U.S. Cl.
CPC .............. *H01M 2/0215* (2013.01); *H01M 2/30* (2013.01); *H01M 2/34* (2013.01); *H01M 10/425* (2013.01); *H01M 2/365* (2013.01)
USPC ............................................ 429/175; 429/61

(58) Field of Classification Search
None
See application file for complete search history.

(56) References Cited

U.S. PATENT DOCUMENTS

| | | | |
|---|---|---|---|
| 6,071,557 A | 6/2000 | Haraguchi et al. | |
| 2004/0126656 A1 | 7/2004 | Cho | |
| 2004/0228061 A1 | 11/2004 | Kim et al. | |
| 2008/0176131 A1 | 7/2008 | Byun et al. | |
| 2009/0130554 A1 | 5/2009 | Jang et al. | |

FOREIGN PATENT DOCUMENTS

| | | |
|---|---|---|
| JP | 1999-170069 | 6/1999 |
| JP | 2002-289160 | 10/2002 |
| JP | 2005-276575 | 10/2005 |
| KR | 10-1999-0051072 | 7/1999 |
| KR | 1020040054232 A | 6/2004 |
| KR | 1020040057362 A | 7/2004 |
| KR | 1020060059696 A | 6/2006 |
| KR | 10-2008-0068266 | 7/2008 |
| KR | 10-2009-0051590 | 5/2009 |

OTHER PUBLICATIONS

Cited in Korean Office Action dated Apr. 30, 2013 issued by KIPO which connection with Korean Patent Application No. 10-2012-0056225, which claims U.S. Appl. No. 13/477,931 as its priority document and Request for Entry of the Accompanying Office Action attached herewith.

Korean Notice of Allowance issued on Nov. 25, 2013 in connection with Korean Patent Application No. 10-2012-0056225 and Request for Entry of the Accompanying Office Action attached herewith.

*Primary Examiner* — Jonathan Crepeau
(74) *Attorney, Agent, or Firm* — Robert E. Bushnell, Esq.

(57) ABSTRACT

A battery pack having a can housing having an electrode assembly and electrolyte, this can may include a cap plate coupled to an open end of the can. A recess is provided on a surface of the cap plate. A metal plate made of a material different from the cap plate is embedded in the recess. The metal plate includes a plurality grooves on at least one surface.

15 Claims, 14 Drawing Sheets

BATTERY PACK

CLAIM OF PRIORITY

This application claims priority to and the benefit of Provisional Application No. 61/489,812, filed on 25 May 2011, in The United States Patent and Trademark Office, the entire content of which is incorporated herein by reference.

BACKGROUND OF THE INVENTION

1. Field of the Invention

The present invention generally relates to a battery pack.

2. Description of Related Art

Due to their advantages, secondary batteries are applied to various technical fields across all industries, and are used as energy sources of portable electronic devices such as a digital camera, a cellular phone, and a laptop computer. Representative secondary batteries include a nickel (Ni)-cadmium (Cd) batteries, a Ni-metal hydride (MH) batteries, a lithium (Li) batteries, and a Li-ion batteries.

Before being placed in electronic products, a reliability test is performed on secondary batteries to test their stability against impact. If an impact is applied to a secondary battery, e.g., if the secondary battery is dropped on the floor, and thus if physical or electrical connection between components of the secondary battery is broken or a material sealed in the secondary battery is cause to leak, the secondary battery may not operate normally. Accordingly, there appears to be a need to enhance the reliability of secondary batteries by preventing leakage of an electrolyte and/or disconnection between components.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a battery system that improves the reliability of secondary batteries by preventing leakage of an electrolyte and/or disconnection between components.

According to one or more embodiments of the present invention, a battery pack is provided having a can housing an electrode assembly and electrolyte. This can may include a cap plate coupled to an open end of the can, a recess on a surface of the cap plate and a metal plate composed of a Material different from the cap plate and embedded in the recess. The metal plate may include a number grooves on at least one surface.

The battery may include a protection circuit module including at least one protection element coupled to a circuit board, a first lead tab coupled to the circuit board and a second lead tab coupled to the circuit board. The metal plate may be electrically connected to the second lead tab.

The battery pack may have the plurality grooves predominately formed along the periphery of the metal plate.

The battery pack may have the cap plate further including a through hole through which an electrode terminal connected to the electrode assembly passes through. An insulator may be disposed between the electrode terminal and cap plate, and the protection circuit module comprises a first hole by which the second lead tab is welded to the metal plate.

The battery pack may have the recess contains a plurality grooves corresponding to the plurality grooves of the metal plate.

The battery pack may have the protection circuit module including a second hole by which the first lead tab is welded to the electrode terminal.

The battery pack the metal plate may include a first metal layer and a second metal layer attached to said first metal layer. The first metal layer is composed of material different from the second metal layer.

The battery pack may have the first metal layer composed of aluminum or an aluminum alloy and the second metal layer may be composed of nickel or a nickel alloy.

The battery pack may have the second metal layer being welded to the second lead tab.

The battery pack may have the first metal layer composed of the same material as the cap plate.

The battery pack may have the metal plate being ultrasonic welded to the cap plate.

The battery pack may have the second lead tab welded to the metal plate by resistive welding.

The battery pack may have both the first and second metal layers each have a number of grooves on at least one surface of each.

The battery pack may have the metal plate include a single layer of nickel or a nickel alloy and the cap plate may be composed of aluminum or an aluminum alloy.

The battery pack may have the metal plate ultrasonically welded to the cap plate.

The battery pack may have the metal plate composed of the same material as the second lead tab.

The battery pack may have the second lead tab welded to the metal plate using resistive welding.

The battery pack may have the second hole located in the approximate center of the protective circuit module corresponding to the electrode terminal.

The plurality grooves of the battery pack may denote the welding position between the metal plate and the recess of the cap plate with the cap plate welded predominately along the periphery of the metal plate.

The battery pack may have the welding of the second lead tab to the metal plate so that it does not overlap the welding of the metal plate and the recess of the cap plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
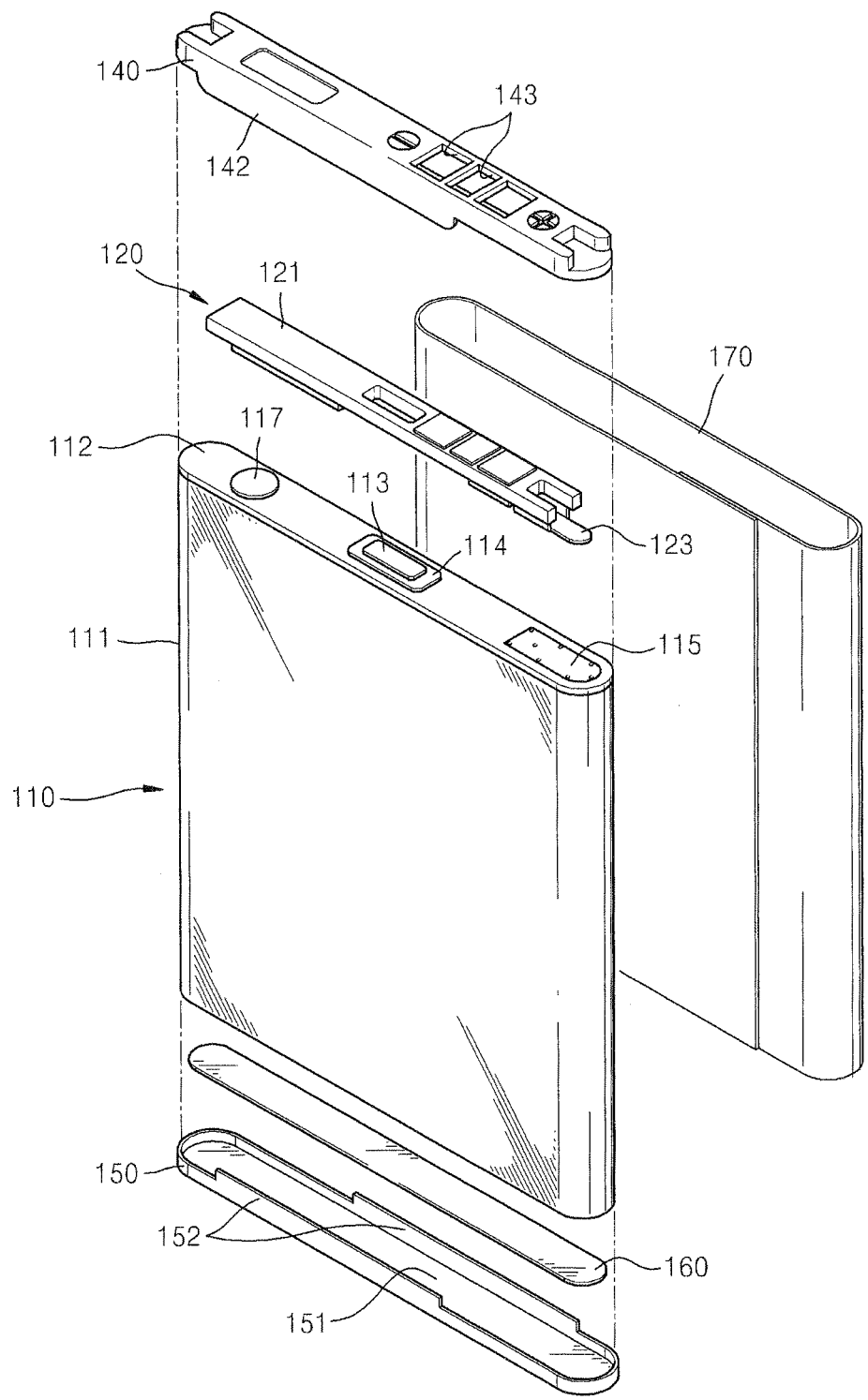
FIG. 1 is an exploded perspective view of a battery pack according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. Meanwhile, the terminology used herein is for the purpose of describing particular embodiments and is not intended to limiting the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Also, it will be understood that, although the terms first, second, etc. may be used herein to describe various elements, these elements should not be limited by these terms. These terms are only used to distinguish one element from another.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2A:
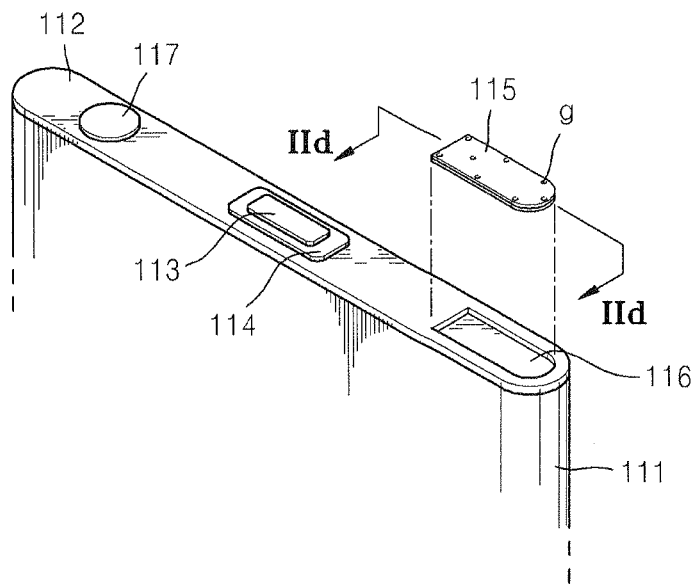
FIGS. 2A through 2C are perspective views of an upper portion of a bare cell illustrated in FIG. 1, according to an embodiment of the present invention, and show a process of forming a cap plate including heterogeneous materials.
Figure 2B:
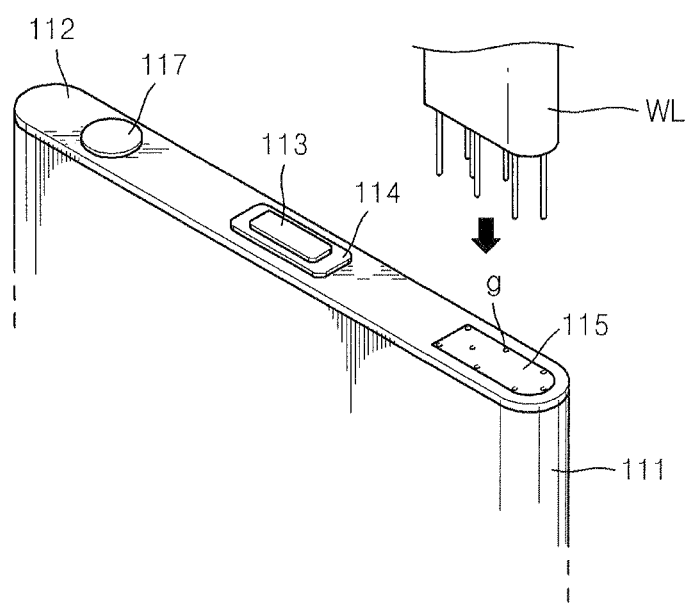
Figure 2C:
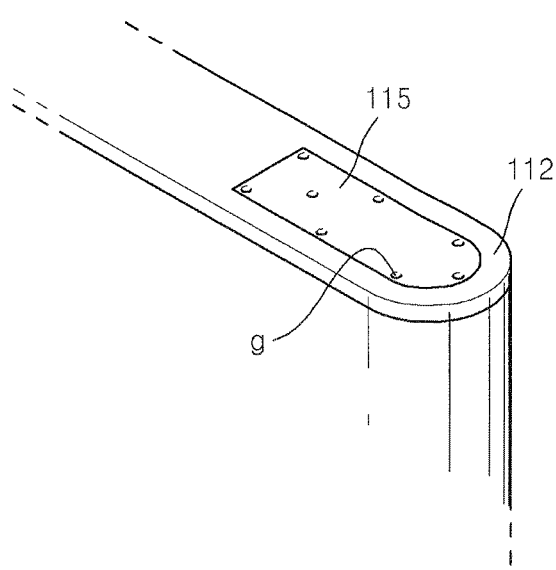
Figure 2D:
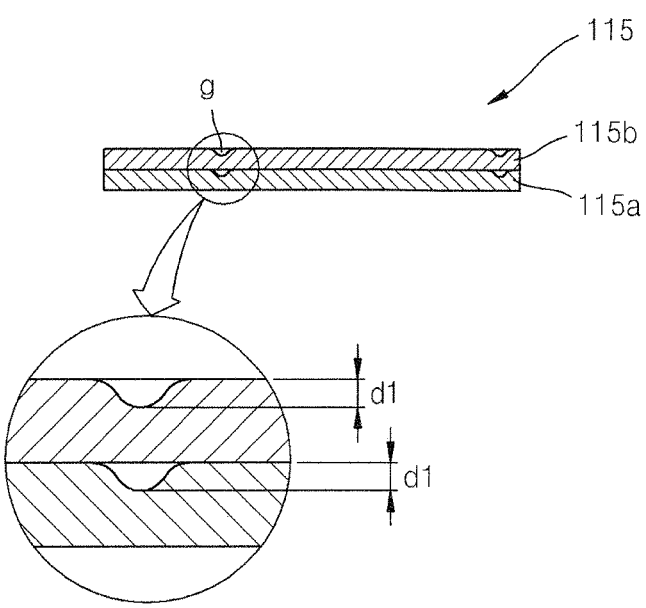
FIG. 2D is a cross-sectional view taken along a line II d-II d of FIG. 2A.

FIG. 1 is an exploded perspective view of a battery pack according to an exemplary embodiment of the present invention. FIGS. 2A through 2C are perspective views of an upper portion of a bare cell illustrated in FIG. 1, according to an exemplary embodiment of the present invention that illustrates a process of forming a cap plate including heterogeneous materials. FIG. 2D is a cross-sectional view taken along a line II d-II d of FIG. 2A.

Referring to FIG. 1, the battery pack may include a bare cell 110, a protection circuit module 120, an upper case 140, a lower case 150, and a label 170.

The bare cell 110 may include an electrode assembly (not shown), a can 111 for accommodating the electrode assembly, and a cap plate 112 for covering an opening of the can 111.

The electrode assembly may be formed as a jelly roll by disposing a separator (not shown) between positive and negative electrode plates (not shown) to form a stacked structure, and then winding the stacked structure. Positive and negative electrode tabs (not shown) may be respectively coupled to the positive and negative electrode plates.

The can 111 has one open end and may have a rectangular parallelepiped shape that provides a space for accommodating the electrode assembly and an electrolyte. The can 111 may be at least partially composed of a conductive metallic material. For example, the can 111 may be at least partially composed of aluminum (Al) or an Al alloy. The can 111 may be electrically connected to the positive electrode tab coupled to the positive electrode plate of the electrode assembly, and may function as a positive electrode terminal.

Referring to FIGS. 1 and 2A, the cap plate 112 is formed to fit the opening of the can 111 and seals the opening. In order to inject the electrolyte after the cap plate 112 seals an upper portion of the can 111, an electrolyte inlet may be formed at a side of the cap plate 112. After the electrolyte is injected, the electrolyte inlet is sealed by a plug 117.

The cap plate 112 may include a conductive metallic material such as Al or an Al alloy. Like the can 111, the cap plate 112 may be electrically connected to the positive electrode tab coupled to the positive electrode plate of the electrode assembly, and may function as a positive electrode terminal.

An electrode terminal 113 may be formed to penetrate through the cap plate 112. The electrode terminal 113 may be electrically connected to the negative electrode tab coupled to the negative electrode plate of the electrode assembly, and may function as a negative electrode terminal. In order to electrically insulate the cap plate 112 functioning as a positive electrode terminal and the electrode terminal 113 functioning as a negative electrode terminal, an insulator 114 may be disposed between the electrode terminal 113 and the cap plate 112.

Although the cap plate 112 and the can 111 function as a positive electrode terminal and the electrode terminal 113 functions as a negative electrode terminal in the current embodiment, the present invention is not limited thereto. For example, according to electrical connection between the positive and negative electrode tabs, the cap plate 112 and the can 111 may function as a negative electrode terminal and the electrode terminal 113 may function as a positive electrode terminal.

The cap plate 112 may include heterogeneous materials to connect the bare cell 110 and the protection circuit module 120. For example, a metal plate 115 including a material different from the material forming the cap plate 112 may be integrated with the cap plate 112. A recess 116 accommodating the metal plate 115 may be formed in an upper surface of the cap plate 112. Since the metal layer 115 is accommodated in the recess 116, an overall thickness of the cap plate 112 may be reduced.

Referring to FIGS. 2A through 2D, the metal plate 115 may be integrated with the cap plate 112 by using an ultrasonic welding method, while being accommodated in the recess 116. The metal plate 115 may include two or more metal layers. For example, the metal plate 115 may be a clad metal layer including different materials. For example, the metal plate 115 may include a first metal layer 115a including Al, or an alloy thereof, and coupled to the cap plate 112, and a second metal layer 115b including nickel (Ni), or an alloy thereof, and coupled to a second lead tab 123. The first and second metal layers 115a and 115b may be integrated by using a thermal bonding method.

Since the first metal layer 115a includes the same material as the cap plate 112, the first metal layer 115a of the metal plate 115 is easily welded to the cap plate 112 and a coupling force therebetween is enhanced. In order to firmly fix and bond the metal plate 115 accommodated in the recess 116 to the cap plate 112, a plurality of grooves (g) may be formed in the metal plate 115 and ultrasonic welding may be performed mainly near the grooves (g). The depth d1 of the grooves (g) may be less than a thickness of the metal plate 115. For example, if the grooves (g) are formed in each of the first and second metal layers 115a and 115b, the depth d1 of the grooves (g) may be less than a thickness of each of the first and second metal layers 115a and 115b.

A welding machine WL includes tips corresponding to aligned positions of the grooves (g) formed in the metal plate 115. If the welding machine WL is disposed on the metal plate 115 and applies ultrasonic vibration to the metal plate 115, stress is concentrated on the grooves (g) because unevenness on a surface of the metal plate 115 causes local stress concentration on the metal plate 115. The grooves (g) and neighboring regions of the grooves (g) may be easily heated and melted due to concentration of energy caused by the ultrasonic vibration, and the metal plate 115 may be bonded onto a surface of the recess 116 with respect to the grooves (g). After that, the ultrasonic vibration of the welding machine WL is transferred to the whole metal plate 115 to further enhance the coupling with the surface of the recess 116.

Although the grooves (g) are round and concave in the current embodiment, but the present invention is not limited thereto. The grooves (g) may have any shape as long as the shape causes unevenness on the surface of the metal plate 115.

Figure 3A:
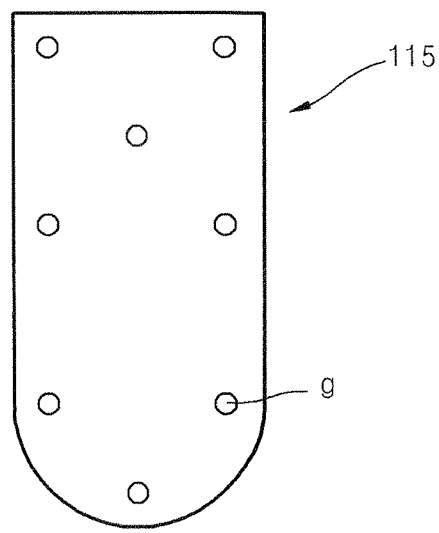
FIG. 3A is a top view of a metal plate illustrated in FIG. 2A.
Figure 3B:
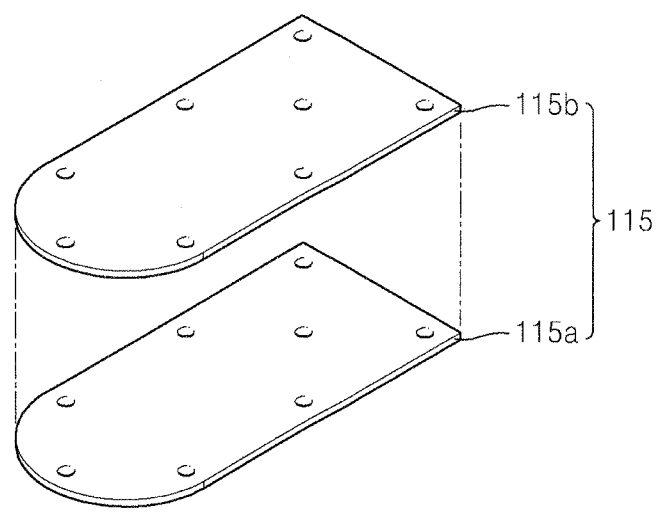
FIG. 3B is an exploded perspective view of the metal plate illustrated in FIG. 3A.

FIG. 3A is a top view of the metal plate 115 illustrated in FIG. 2A. FIG. 3B is an exploded perspective view of the metal plate 115 illustrated in FIG. 3A.

Referring to FIGS. 3A and 3B, the grooves (g) may be formed along edges of the metal plate 115. For example, the grooves (g) may be formed in each of the first and second metal layers 115a and 115b. According to another embodiment of the present invention, although not shown in FIGS. 3A and 3B, the grooves (g) may be formed in any one or both of the first and second metal layers 115a and 115b.

The grooves (g) may be aligned along the edges of the metal plate 115. After being bonded to the recess 116, the metal plate 115 may be bonded to the second lead tab 123 of the protection circuit module 120 using a welding method. The welding between the second lead tab 123 and the metal plate 115 is performed while the second lead tab 123 contacts the metal plate 115, and a welding position is a central region of the metal plate 115. Since a reduction in strength may be caused if the welding position between the second lead tab 123 and the metal plate 115 overlaps the welding position between the metal plate 115 and the recess 116, the grooves (g) are aligned along edges to prevent interference with the welding position between the second lead tab 123 and the metal plate 115.

Also, unless the welding position between the second lead tab 123 and the metal plate 115 does not overlap the welding position between the metal plate 115 and the recess 116, the number of welding positions on the metal plate 115 may be relatively increased. Accordingly, a coupling force of the metal plate 115 may be enhanced.

Referring back to FIG. 1, the second lead tab 123 of the protection circuit module 120 is bonded to the metal plate 115 of the cap plate 112 by using a resistive welding method, and thus the bare cell 110 may be electrically connected to the protection circuit module 120. In this case, since the second metal layer 115b of the metal plate 115 includes the same material as the second lead tab 123, the second lead tab 123 is easily welded to the second metal layer 115b of the metal plate 115 and a coupling force therebetween is enhanced.

FIGS. 4A through 4D are perspective views of an upper portion of the bare cell 110 illustrated in FIG. 1, according to another embodiment of the present invention, and show a process of forming a cap plate 112' including heterogeneous materials. FIG. 4E is a cross-sectional view taken along a line IVe-IVe of FIG. 4A. FIG. 5A is a cross-sectional view taken along a line V a-V a of FIG. 4A. FIG. 5B is a cross-sectional view taken along a line V b-V b of FIG. 4D.

Referring to FIGS. 4A through 4D, a metal plate 115' may include first and second metal layers 115a' and 115b', and the first and second metal layers 115a' and 115b' may be integrated by using a thermal bonding method. The first metal layer 115a' may include the same material as the cap plate 112', and the second metal layer 115b' may include the same material as the lead tab 123. In the current exemplary embodiment, grooves are not formed in the metal plate 115'.

Referring to FIGS. 5A and 5B, the current exemplary embodiment is different from the previous embodiments described in relation to FIGS. 2A through 2D, 3A, and 3B in that grooves (g') are formed in a recess 116'.

The cap plate 112' including heterogeneous materials is formed as follows. The metal plate 115' is accommodated in the recess 116', and then the welding machine WL is disposed on the metal plate 115'. In this case, the welding machine WL may include tips corresponding to aligned positions of the grooves (g') formed in the recess 116'. If the welding machine WL applies a predetermined pressure and ultrasonic vibration to the metal plate 115', stress may be concentrated on the grooves (g') through the metal plate 115'. Accordingly, energy caused by the ultrasonic vibration is concentrated on the grooves (g'), an increase in temperature is caused, and the metal plate 115' is melted and bonded to a surface of the recess 116' with respect to the grooves (g'). After that, the ultrasonic vibration of the welding machine WL is transferred to the whole metal plate 115' and the whole surface of the recess 116' to further enhance the coupling therebetween.

In this case, as described above in relation to FIGS. 3A and 3B, the grooves (g'), i.e., a welding position between the metal plate 115' and the recess 116', may be formed along edges to prevent interference with a welding position between the metal plate 115' and the second lead tab 123.

A depth d2 of the grooves (g') may be equal to or less than a thickness of the metal plate 115'.

Figure 4A:
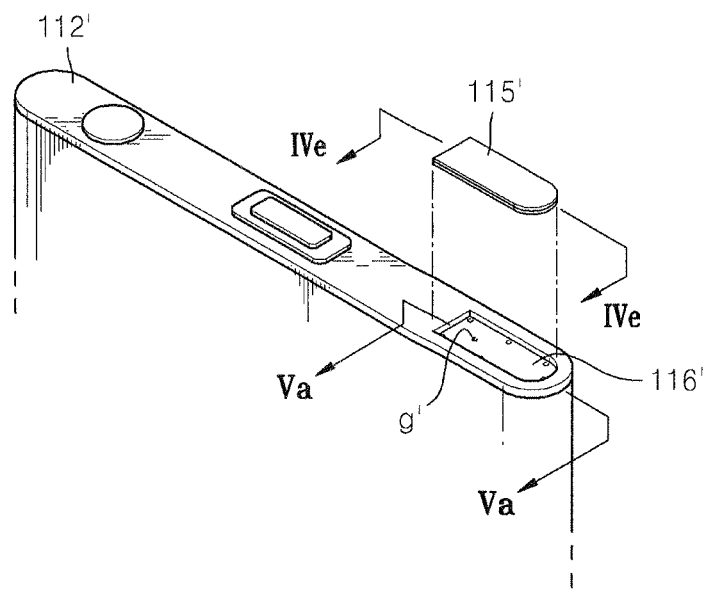
FIGS. 4A through 4D are perspective views of an upper portion of the bare cell illustrated in FIG. 1, according to another embodiment of the present invention, and show a process of forming a cap plate including heterogeneous materials.
Figure 4B:
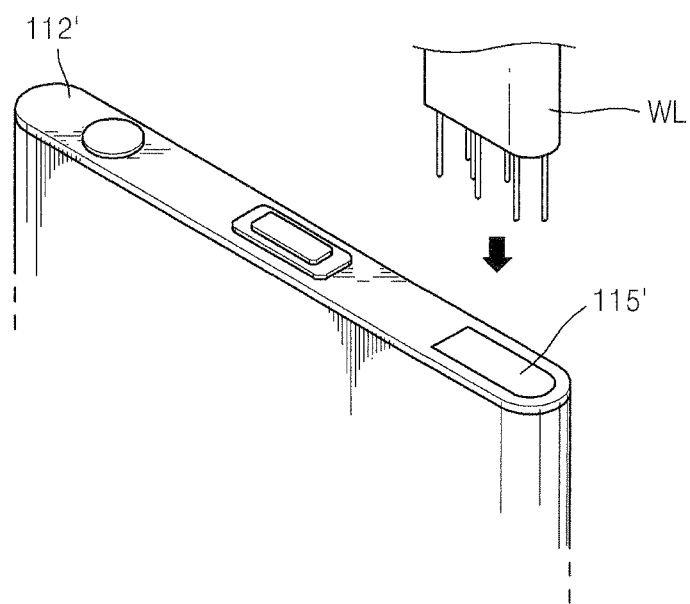
Figure 4C:
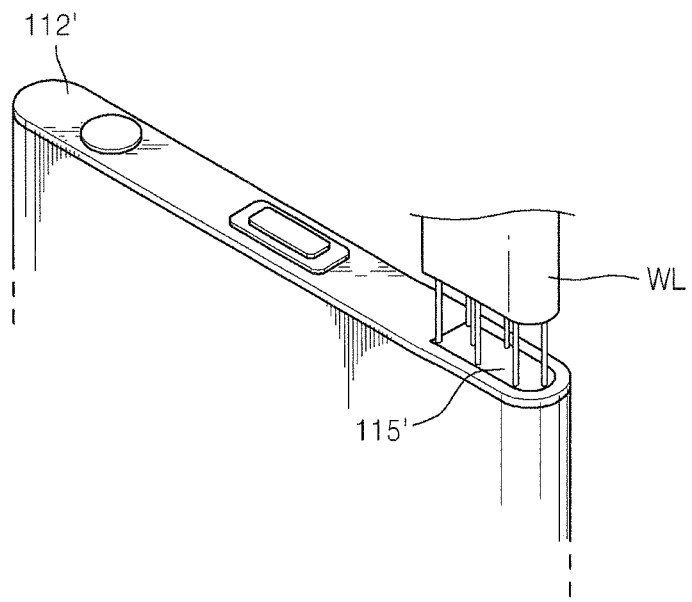
Figure 4D:
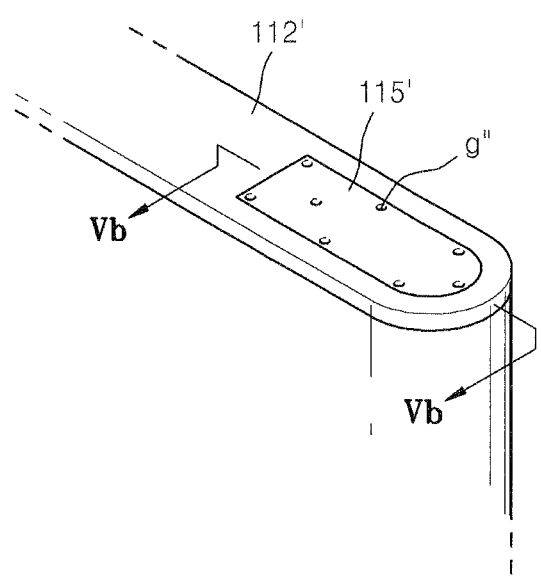
Figure 4E:
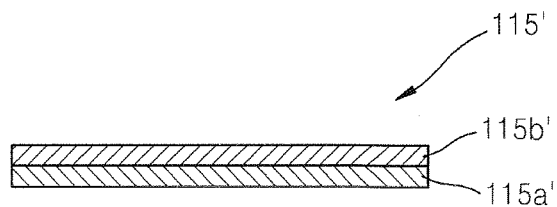
FIG. 4E is a cross-sectional view taken along a line IVe-IVe of FIG. 4A.
Figure 5A:
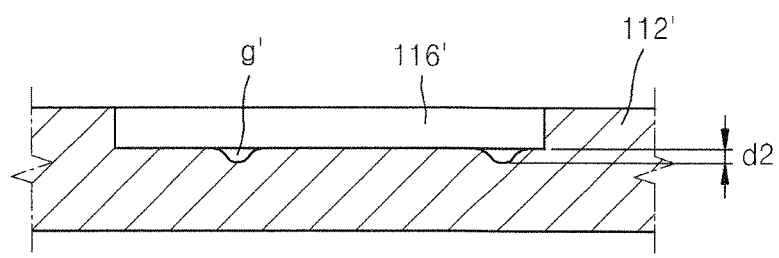
FIG. 5A is a cross-sectional view taken along a line V a-V a of FIG. 4A.
Figure 5B:
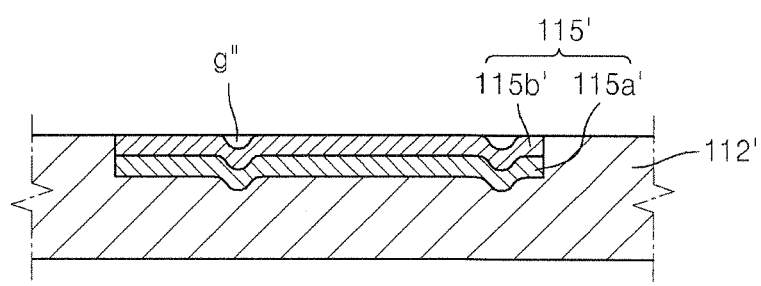
FIG. 5B is a cross-sectional view taken along a line V b-V b of FIG. 4D.

Referring to FIGS. 4A, 4D, and 5B, after the metal plate 115' having a flat shape is welded, grooves (g") corresponding to the tips of the welding machine WL may be formed in the metal plate 115'. In this case, since the tips of the welding machine WL correspond to the grooves (g') of the recess 116', the grooves (g") of the metal plate 115' may overlap the grooves (g') of the recess 116'.

Figure 6A:
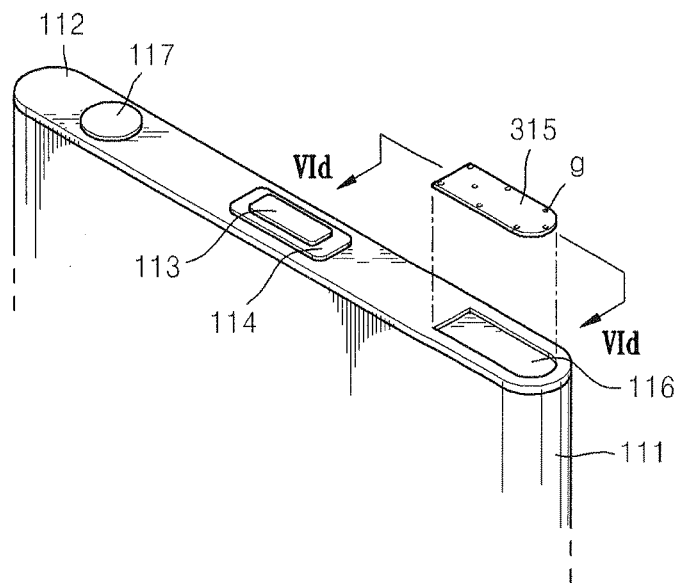
FIGS. 6A through 6C are perspective views of an upper portion of the bare cell illustrated in FIG. 1, according to another embodiment of the present invention, and show a process of forming a cap plate including heterogeneous materials.
Figure 6B:
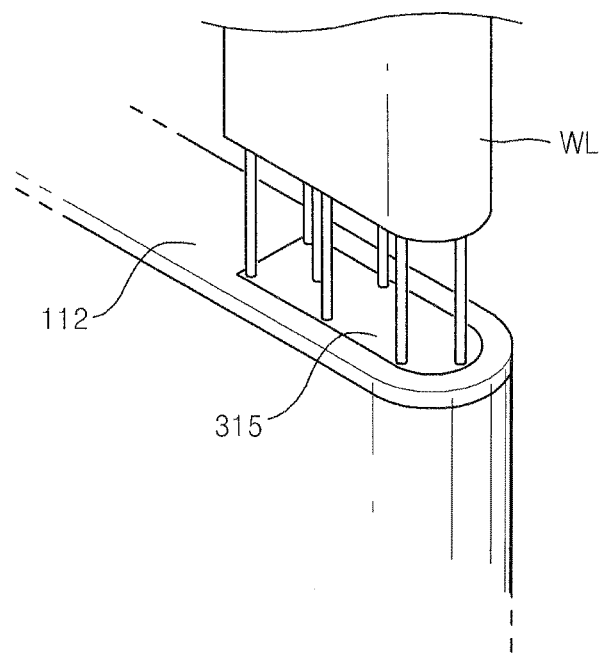
Figure 6C:
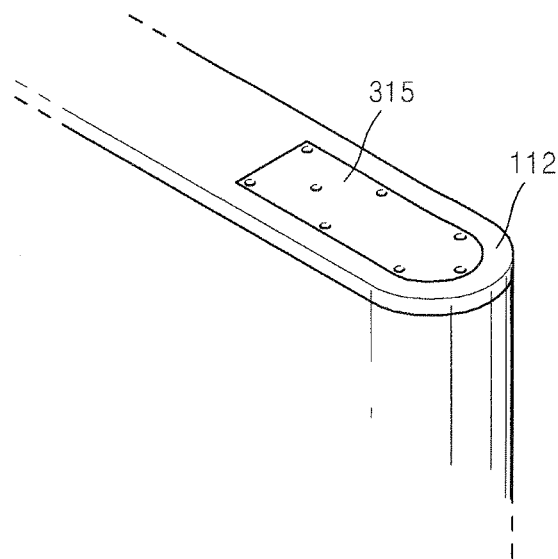
Figure 6D:
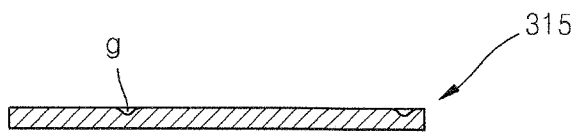
FIG. 6D is a cross-sectional view taken along a line VId-VId of FIG. 6A.

FIGS. 6A through 6C are perspective views of an upper portion of the bare cell 110 illustrated in FIG. 1, according to another exemplary embodiment of the present invention, and show a process of forming the cap plate 112 including heterogeneous materials. FIG. 6D is a cross-sectional view taken along a line VId-VId of FIG. 6A.

Referring to FIGS. 6A through 6D, a metal plate 315 integrated with the cap plate 112 may be a single metal layer including Ni, or an alloy thereof. In this case, a depth of the recess 116 formed in the cap plate 112 may be less than that in FIG. 2B. The metal plate 315 may be accommodated in the recess 116 of the cap plate 112, and then may be integrated with the cap plate 112 by using an ultrasonic welding method.

In order to be easily welded to the second lead tab 123, the metal plate 315 may include the same material as the second lead tab 123. Since the metal plate 315 includes the same material as the second lead tab 123, the second lead tab 123 is easily welded to the metal plate 315 and a coupling force therebetween is enhanced. The second lead tab 123 may be welded to the metal plate 315 by using a resistive welding method. For example, the welding machine WL including tips corresponding to aligned positions of the grooves (g) formed in the metal plate 315 is disposed on the metal plate 315. If the welding machine WL applies ultrasonic vibration to the metal plate 315, stress is concentrated on the grooves (g). The grooves (g) and neighboring regions of the grooves (g) may be easily heated and melted due to concentration of energy caused by the ultrasonic vibration, and the metal plate 315 may be bonded onto a surface of the recess 116 with respect to the grooves (g). After that, the ultrasonic vibration of the welding machine WL is transferred to the whole metal plate 315 to further enhance the coupling with the surface of the recess 116. In this case, since the grooves (g) are aligned along edges of the metal plate 315, interference with a welding position between the metal plate 315 and the second lead tab 123 may be prevented.

Since the metal plate 315 of the cap plate 112 is bonded to the second lead tab 123 of the protection circuit module 120 using a welding method, the bare cell 110 may be electrically connected to the protection circuit module 120.

Figure 7A:
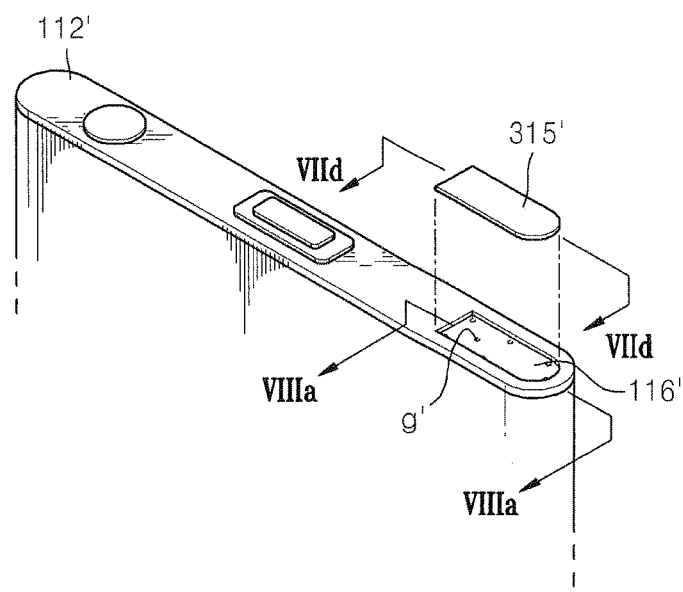
FIGS. 7A through 7C are perspective views of an upper portion of the bare cell illustrated in FIG. 1, according to another embodiment of the present invention, and show a process of forming a cap plate including heterogeneous materials.
Figure 7B:
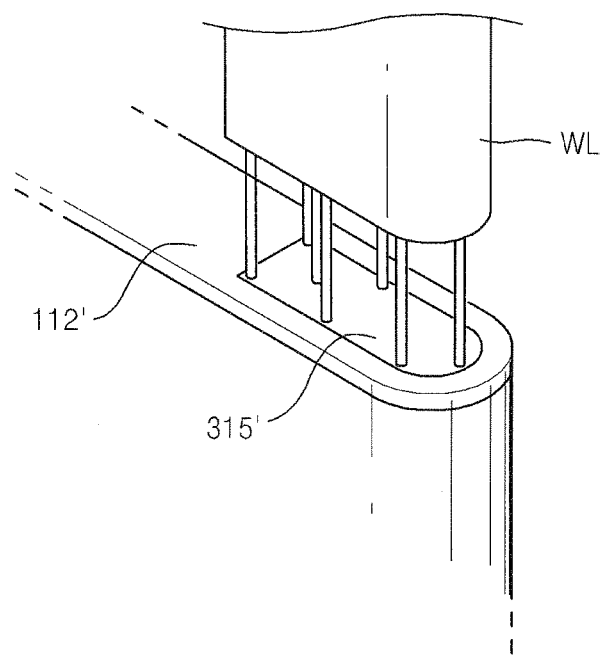
Figure 7C:
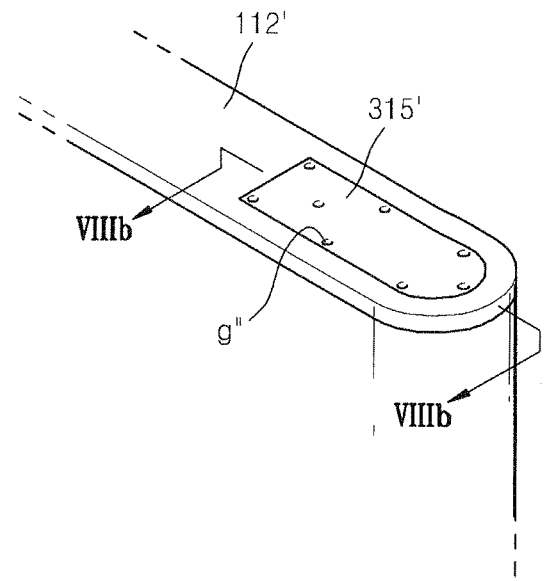
Figure 7D:
FIG. 7D is a cross-sectional view taken along a line VIId-VIId of FIG. 7A.
Figure 8A:
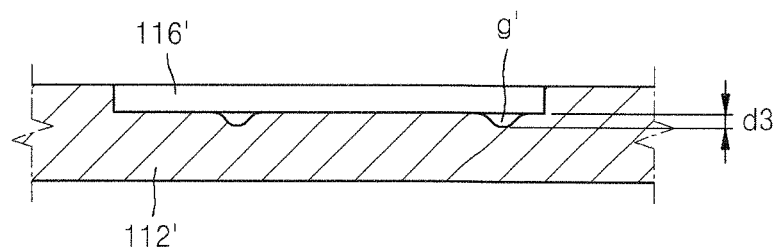
FIG. 8A is a cross-sectional view taken along a line VIIIa-VIIIa of FIG. 7A.
Figure 8B:
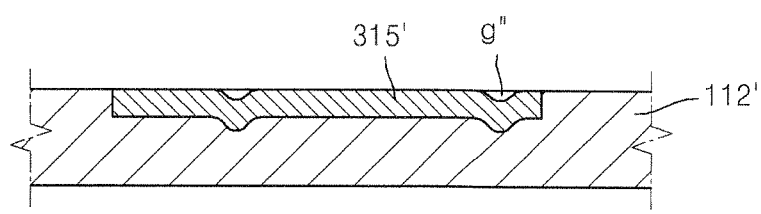
FIG. 8B is a cross-sectional view taken along a line VIIIb-VIIIb of FIG. 7D.

FIGS. 7A through 7C are perspective views of an upper portion of the bare cell 110 illustrated in FIG. 1, according to another exemplary embodiment of the present invention, and show a process of forming a cap plate 112' including heterogeneous materials. FIG. 7D is a cross-sectional view taken along a line VIId-VIId of FIG. 7A. FIG. 8A is a cross-sectional view taken along a line VIIIa-VIIIa of FIG. 7A. FIG. 8B is a cross-sectional view taken along a line VIIIb-VIIIb of FIG. 7D.

Referring to FIGS. 7A through 7D, a metal plate 315' may be a single metal layer and may include the same material as the lead tab 123. In the current exemplary embodiment, grooves are not formed in the metal plate 315'.

Referring to FIGS. 8A and 8B, the current embodiment is different from the previous embodiment described in relation to FIGS. 6A through 6D in that grooves (g') are formed in a recess 116'.

The cap plate 112' including heterogeneous materials is formed as follows. The metal plate 315' is accommodated in the recess 116', and then the welding machine WL is disposed on the metal plate 315'. In this case, the welding machine WL may include tips corresponding to aligned positions of the grooves (g') formed in the recess 116'. If the welding machine WL applies a predetermined pressure and ultrasonic vibration to the metal plate 315', stress may be concentrated on the grooves (g') through the metal plate 315'. Accordingly, energy caused by the ultrasonic vibration is concentrated on the grooves (g'), an increase in temperature is caused, and the metal plate 315' is melted and bonded to a surface of the recess 116' with respect to the grooves (g'). After that, the ultrasonic vibration of the welding machine WL is transferred to the whole metal plate 315' and the whole surface of the recess 116' to further enhance the coupling therebetween.

In this case, as described above in relation to FIGS. 3A and 3B, the grooves g', i.e., a welding position between the metal plate 315' and the recess 116', may be formed along edges to prevent interference with a welding position between the metal plate 315' and the second lead tab 123.

Referring to FIGS. 7A, 7C, and 8B, after the metal plate 315' having a flat shape is welded, grooves (g") corresponding to the tips of the welding machine WL may be formed in the metal plate 315'. In this case, since the tips of the welding machine WL correspond to the grooves (g') of the recess 116', the grooves (g") of the metal plate 315' may overlap the grooves (g') of the recess 116'.

Figure 9A:
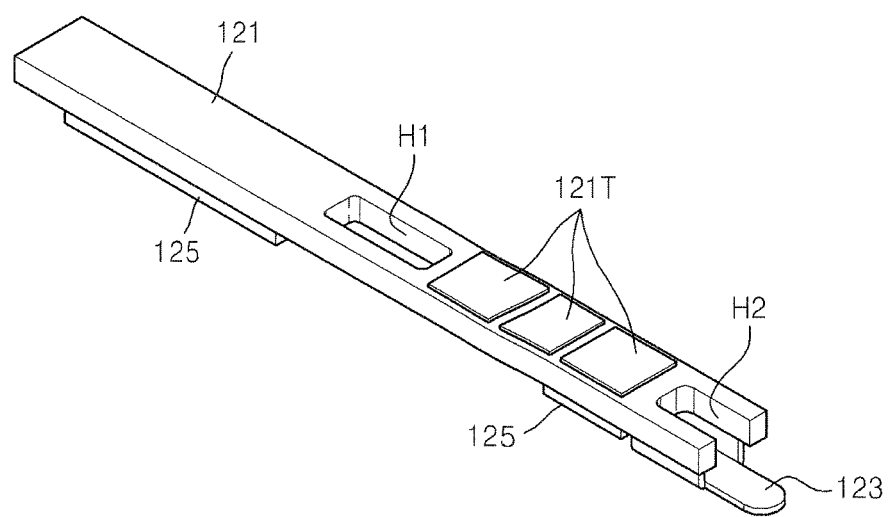
FIG. 9A is a perspective view of a protection circuit module illustrated in FIG. 1, according to an embodiment of the present invention.
Figure 9B:
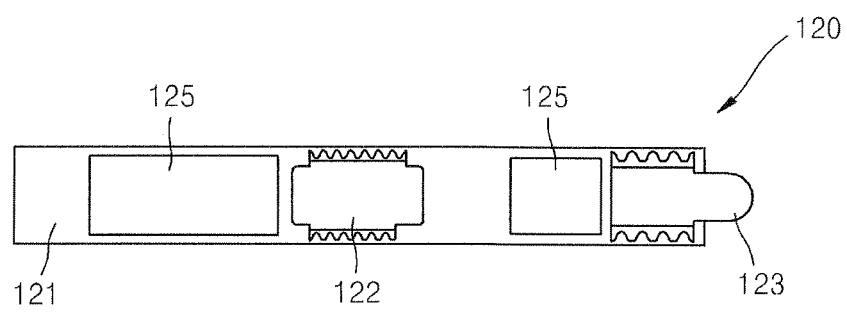
FIG. 9B is a bottom view of the protection circuit module illustrated in FIG. 9A.

FIG. 9A is a perspective view of the protection circuit module 120 illustrated in FIG. 1, according to an embodiment of the present invention. FIG. 9B is a bottom view of the protection circuit module 120 illustrated in FIG. 9A.

Referring to FIGS. 1, 9A, and 9B, the protection circuit module 120 is electrically connected to the bare cell 110, and controls overcharge, overdischarge, and overcurrent of the bare cell 110. A protection element 125 may selectively include a safety element including an active element such as a field effect transistor and a passive element such as a resistor or a condenser, and integrated circuits. The protection element 125 may be disposed on any one surface of a circuit board 121. Alternatively, the protection element 125 may be printed on a printed circuit board (PCB) as a circuit module.

The protection circuit module 120 may include the circuit board 121, and first and second lead tabs 122 and 123. The circuit board 121 may be a PCB on which wiring patterns are printed, and extends in one direction. The first lead tab 122 may be formed at the center of a lower surface of the circuit board 121, and the second lead tab 123 may be formed at one end of the lower surface.

The first lead tab 122 may be electrically connected to the electrode terminal 113 functioning as a negative electrode terminal of the bare cell 110. In this case, in order to weld the first lead tab 122 to the electrode terminal 113, a first through hole 111 may be formed at a location corresponding to the first lead tab 122, i.e., the center of the circuit board 121.

The second lead tab 123 may be electrically connected to the cap plate 112 functioning as a positive electrode terminal of the bare cell 110. In this case, in order to weld the second lead tab 123 to the cap plate 112, a second through hole H2 may be formed at a location corresponding to the second lead tab 123, i.e., one end of the circuit board 121.

Figure 10:
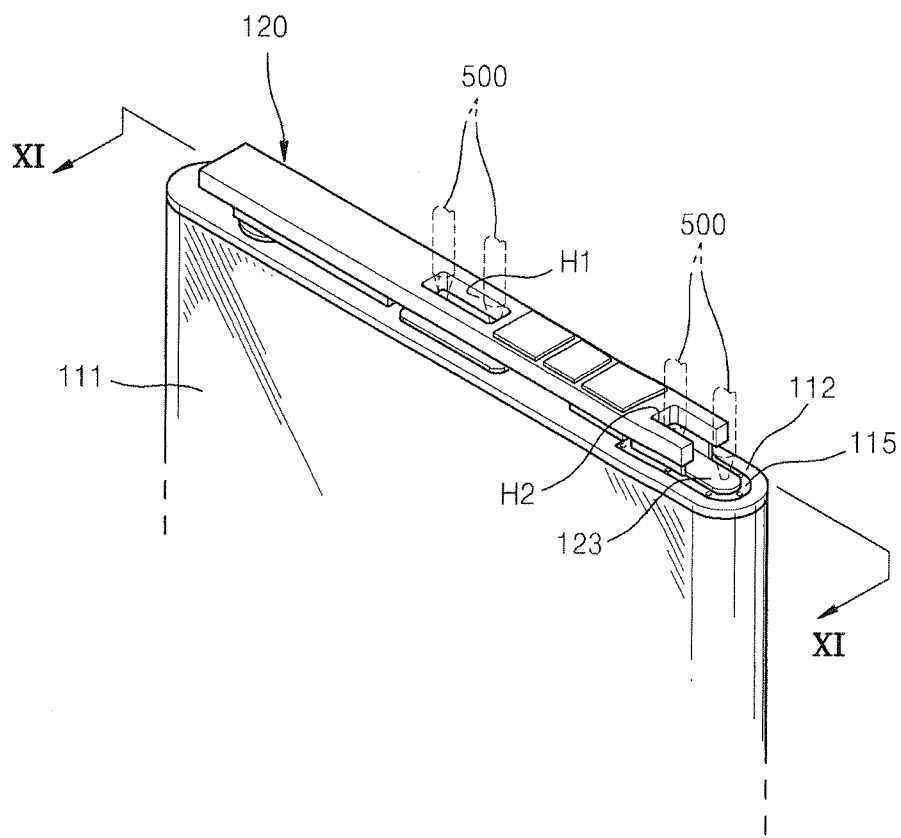
FIG. 10 is a perspective view showing a welding process performed while the protection circuit module is disposed on the bare cell illustrated in FIG. 1.
Figure 11:
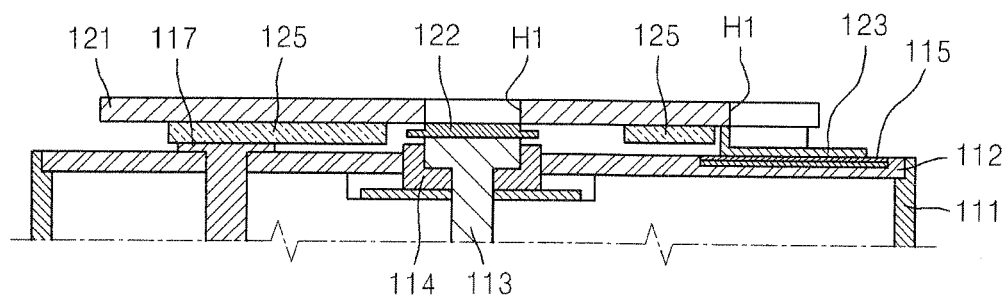
FIG. 11 is a cross-sectional view taken along a line XI-XI of FIG. 10.

FIG. 10 is a perspective view showing a welding process performed while the protection circuit module 120 is disposed on the bare cell 110 illustrated in FIG. 1. FIG. 11 is a cross-sectional view taken along a line XI-XI of FIG. 10.

Referring to FIGS. 10 and 11, after the protection circuit module 120 is disposed on the cap plate 112 of the bare cell 110, the first lead tab 122 may be welded to the electrode terminal 113 and the second lead tab 123 may be welded to the cap plate 112 by using a welding rod 500. Due to the welding, the first lead tab 122 may physically contact and may be electrically connected to the electrode terminal 113, and the second lead tab 123 may physically contact and may be electrically connected to the cap plate 112. In this case, a welding position is a central region of the metal plate 115 in order not to overlap the grooves g, i.e., a welding position between the metal plate 115 and the cap plate 112 and thus to prevent interference between ultrasonic and resistive welding points.

If the protection circuit module 120 is disposed on the cap plate 112 of the bare cell 110, the first lead tab 122 formed at the center of the lower surface of the protection circuit module 120 contacts the electrode terminal 113. In this state, the welding rod 500 may be inserted into the first through hole H1 and may bond the first lead tab 122 to the electrode terminal 113. Welding may be performed on two spots spaced apart by a predetermined distance while the first lead tab 122 contacts the electrode terminal 113. In this case, a resistive welding method may be used to enhance a coupling force between the first lead tab 122 and the electrode terminal 113.

If the protection circuit module 120 is disposed on the cap plate 112 of the bare cell 110, the second lead tab 123 formed at one end of the lower surface of the protection circuit module 120 contacts the metal plate 115. Welding may be performed on two spots spaced apart by a predetermined distance. For example, the welding rod 500 may be inserted into the second through hole H2 and may bond the second lead tab 123 to the metal plate 115. After that, the welding rod 500 may be moved rightward in the second through hole H2 and may bond the second lead tab 123 to the metal plate 115 again. A resistive welding method may also be used to enhance a coupling force between the second lead tab 123 and the metal plate 115 of the cap plate 112.

Referring back to FIG. 1, the upper case 140 surrounds the protection circuit module 120 and may be coupled to the upper portion of the bare cell 110. The upper case 140 includes an internal space for accommodating the protection circuit module 120 such that the protection circuit module 120 is covered when the upper case 140 is coupled to the bare cell 110. The upper case 140 may be formed by using an injection molding method.

Openings 143 for externally exposing external terminals 121T formed on the protection circuit module 120 may be formed in the upper case 140 at locations corresponding to the external terminals 121T (see FIGS. 1, 9A, and 9B).

One side wall 142 of the upper case 140 may extend in one direction toward the bare cell 110. When the upper case 140 is coupled to the bare cell 110, the extended side wall 142 may cover an upper portion of a side wall of the can 111 of the bare cell 110.

The lower case 150 may include a bottom surface 151 and side walls 152 extending from the bottom surface 151 toward the bare cell 110. The bottom surface 151 has almost the same shape as a lower surface of the bare cell 110, and may be adhered to the lower surface of the bare cell 110 by using an adhesive member 160 such as double-sided tape. The side walls 152 of the lower case 150 may cover lower portions of the side wall of the can 111 of the bare cell 110.

The label 170 may surround the side wall of the bare cell 110. For example, an adhesive material may be coated on a surface of the label 170 facing the bare cell 110, and thus the label 170 may be adhered to the side wall of the bare cell 110. The label 170 may cover the side wall 142 of the upper case 140 and the side walls 152 of the lower case 150.

According to another exemplary embodiment of the present invention, since the first and second lead tabs 122 and 123 of the protection circuit module 120 are electrically connected to the cap plate 112 without using a laser welding method, leakage of an electrolyte which is caused by the laser welding method may be prevented.

Also, due to the cap plate 112 including heterogeneous materials, the second lead tab 123 of the protection circuit module 120 maybe easily welded to the cap plate 112 of the bare cell 110, and a coupling force therebetween may be enhanced. Accordingly, even when an impact is applied to the battery pack, separation of welded parts may be prevented and thus reliability of the battery pack may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack having a can housing an electrode assembly and electrolyte, said can comprising:
    a cap plate coupled to an open end of the can;
    a recess on a surface of the cap plate;
    a metal plate comprising a material different from the cap plate and embedded in the recess, said metal plate including a plurality of grooves on at least one surface; and
    a protection circuit module including at least one protection element coupled to a circuit board, a first lead tab coupled to the circuit board and a second lead tab coupled to the circuit board; said metal plate comprises:
        a first metal layer; and
        a second metal layer attached to said first metal layer, wherein the first metal layer is composed of material different from the second metal layer, said second metal layer is welded to the second lead tab.

2. The battery pack recited in claim 1, wherein the plurality of grooves are predominately formed along the periphery of the metal plate.

3. The battery pack recited in claim 1, wherein the cap plate further comprises a through hole through which an electrode terminal connected to the electrode assembly passes through, wherein an insulator is disposed between the electrode terminal and cap plate, and the protection circuit module comprises a first hole by which the second lead tab is welded to the metal plate.

4. The battery pack recited in claim 1, wherein the recess contains a plurality of grooves corresponding to the plurality of grooves of the metal plate.

5. The battery pack recited in claim 4, wherein the protection circuit module comprises a second hole by which the first lead tab is welded to the electrode terminal.

6. The battery pack recited in claim 1, wherein the first metal layer comprises aluminum or an aluminum alloy and the second metal layer comprises nickel or a nickel alloy.

7. The battery pack recited in claim 1, wherein the first metal layer comprises the same material as the cap plate.

8. The battery pack recited in claim 7, wherein the metal plate is ultrasonic welded to the cap plate.

9. The battery pack recited in claim 1, wherein second lead tab is welded to the metal plate by resistive welding.

10. The battery pack recited in claim 1, wherein both the first and second metal layers each have a plurality of grooves on at least one surface of each.

11. The battery pack recited in claim 1, wherein the metal plate comprises the same material as the second lead tab.

12. The battery pack recited in claim 11, wherein the second lead tab is welded to the metal plate using resistive welding.

13. The battery pack recited in claim 5, wherein the second hole is located in the approximate center of the protective circuit module corresponding to the electrode terminal.

14. The battery pack recited in claim 2, wherein the plurality of grooves denote the welding position between the metal plate and the recess of the cap plate with the cap plate welded predominately along the periphery of the metal plate.

15. The battery pack recited in claim 1, wherein welding of the second lead tab to the metal plate does not overlap welding of the metal plate and the recess of the cap plate.

* * * * *